US008224739B2

(12) United States Patent
Zhou

(10) Patent No.: US 8,224,739 B2
(45) Date of Patent: Jul. 17, 2012

(54) ALLOCATING GOODS TO BIDDERS IN COMBINATORIAL AUCTIONS

(75) Inventor: Yunhong Zhou, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1242 days.

(21) Appl. No.: 11/830,606

(22) Filed: Jul. 30, 2007

(65) Prior Publication Data
US 2009/0037316 A1    Feb. 5, 2009

(51) Int. Cl.
G06Q 40/00 (2012.01)
(52) U.S. Cl. ........................................................ 705/37
(58) Field of Classification Search ............... 705/37, 705/80, 26
See application file for complete search history.

(56) References Cited

U.S. PATENT DOCUMENTS

| 6,272,473 | B1* | 8/2001 | Sandholm | 705/37 |
| 6,321,207 | B1* | 11/2001 | Ye | 705/8 |
| 6,834,272 | B1* | 12/2004 | Naor et al. | 705/80 |
| 6,839,680 | B1 | 1/2005 | Liu et al. | |
| 2002/0152182 | A1* | 10/2002 | Kashima et al. | 705/80 |
| 2003/0101449 | A1 | 5/2003 | Bentolila et al. | |
| 2003/0225677 | A1* | 12/2003 | Sandholm et al. | 705/37 |
| 2004/0133526 | A1* | 7/2004 | Shmueli et al. | 705/80 |
| 2008/0126176 | A1 | 5/2008 | Iguchi | |

OTHER PUBLICATIONS

Katherine Lei. The Knapsack Problem and Fully Polynomial Time Approximation Schemes (FPTAS). Seminar in Theoretical Computer Science. Mar. 10, 2006.*
The Knapsack Problem and Fully Polynomial Time Approximation Schemes (FPTAS). Katherine Lai. Mar. 10, 2006.*
Improved Fully Polynomial time Approximation Scheme for the 0-1 Multiple-choice Knapsack Problem. Mukul Subodh Bansal. Mar. 30, 2004.*
An O(n) algorithm for the linear multiple choice knapsack problem and related problems. Eitan Zemel. Mar. 30, 1984.*
Anshul Kothari et al. "Approximately-strategy proof and tractable multiunit auctions" online: www.sciencedirect.com. Sep. 27, 2004.
Fenstermacher et al.; "Mining Client-Side Activity for Personalization" Department of Management Information Systems, Eller College of Business and Public Administration, University of Arizona, Jun. 2002.
Baoyao, Zhou; "Intelligent Web Usage Mining" Nanyang Technological University, Division of Information Systems, School of Computer Engineering, 2004.
Baynote Inc.: The Collective Intelligence Platform, Online, http://www.baynote.com/technology/platform/2010.
Hottolink Inc.; "Recognize" Online, http://www.hottolink.co.jp/english/reconize.html, 2009.
Hongjun Lu et al: "Extending a Web Browser with Client-Side Mining," Hong Kong University of Science and TechnologyDepartment of Computer Science, Clear Water Bay, Kowloon, Hong Kong, China, 2003.
Shankar et al.; "Personalized Search Basedon Personalized Web Search Based on Client Side Ontology", CS 498:B. Tech Project, 10. IIT Kanpur, India 2010.

(Continued)

Primary Examiner — Hani M Kazimi
Assistant Examiner — John Preston

(57) ABSTRACT

Embodiments are directed to systems, methods, and apparatus for allocating goods to bidders in combinatorial auctions. In one embodiment, bids are received in a combinatorial auction and the winner determination problem is modeled as an interval knapsack problem (I-KP) or an interval multiple-choice knapsack problem (I-MCKP), efficient algorithms (both pseudo-polynomial-time exact algorithms and FPTAS) for I-KP (and I-MCKP) are used to compute an allocation of goods to winning bidders.

20 Claims, 2 Drawing Sheets

OTHER PUBLICATIONS

Sendhikumar et al.; "Personalized ontology for web search personalization" 1. Anna University, Chennai, India , 2008.

Shahabi et al.; "Yoda an accurate and Scalable Web based Recommendation Sytem?" University of Southern California, Los Angeles, Sep. 2001.

Claypool et al.; "Implicit Interest Indicators", 14. Worcester Polytechnic Institute, Worcester, Computer Science Department Worcester Polytechnic Institute Worcester, MA 01609, USA., 2001.

Shahabi et al.; "A Framework for Efficent and Anonymous Web Usage Mining Based on Client-Side Tracking", 15. University of Southern California, Los Angeles, 2002.

Chattertrap; ONLINE http://www.chattertrap.com; Jul. 20, 2010.

HSNW: SRI defense technology spawns civilian application: published Jun. 29, 2010.

Anthony Ha: Facebook investor backs Chattertrap, a personal assistant for content, Jun. 28, 2010.

Bansal, et al., "Improved Fully Polynomial time Approximation Scheme for the 0-1 Multiple-choice Knapsack Problem", International Institute of Information Technology, Hyderabad, India, viewed on Sep. 6, 2011, retrieved from http://people.csail.mit.edu/mukul/01MCKP.pdf, 10 pages.

* cited by examiner

ALLOCATING GOODS TO BIDDERS IN COMBINATORIAL AUCTIONS

BACKGROUND

Electronic and online auctions provide a convenient mechanism for buying and selling goods. In a simple auction, sellers offer for sale one or more individual items, and buyers bid on these items. The highest bid wins the item.

In combinatorial auctions, potential buyers place bids on combinations of items called packages, as opposed to placing a bid on a single item. Generally, each bidder determines a value for each package being offered. Bidders are not aware of values or bids of other competing bidders. For instance, each bidder specifies different prices for different combinations of good.

Combinatorial auctions are difficult to optimize, and the winner determination problem (WDP) in such auctions is complex. In other words, it is difficult to determine an efficient allocation of goods once the bids have been submitted to the auctioneer. For example, when numerous bids are received in a combinatorial auction, it is difficult to calculate an allocation of items to bidders wherein the seller retains some items (if appropriate) yet maximizes revenue for the seller.

Consequently, a large interest exists in solving the WDP and optimizing bid strategies in combinatorial auctions.

DETAILED DESCRIPTION

Figure 1:
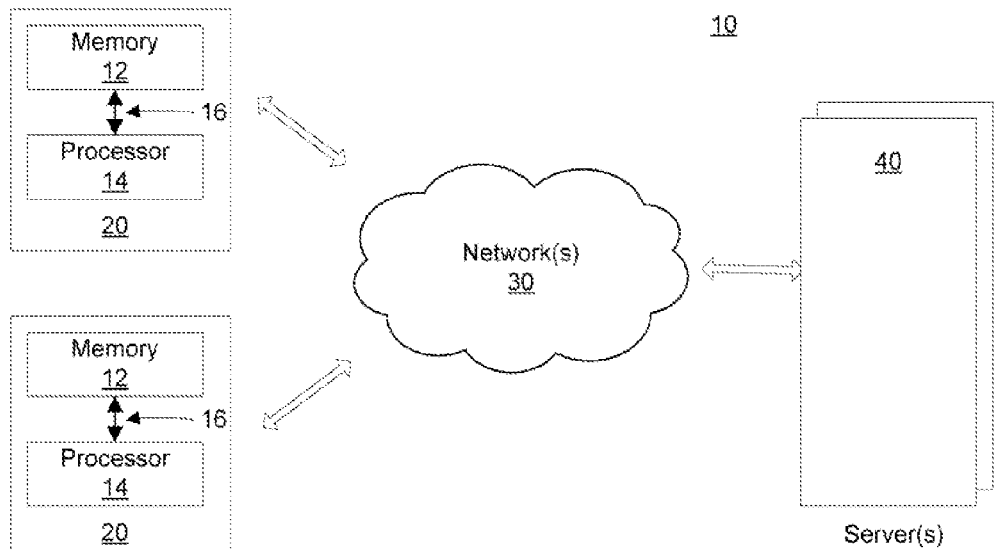
FIG. 1 illustrates an exemplary data processing network in accordance with an exemplary embodiment.

Exemplary embodiments are directed to systems, methods, and apparatus for bidding in combinatorial auctions. Exemplary embodiments optimize bids for the sale of goods and services in electronic and online auctions. One embodiment finds optimal solutions and determines winning bids in combinatorial auctions.

One embodiment evaluates a combinatorial auction and selects one or more bids such that demand for each item for sale is satisfied while at the same time a cost of procurement is optimized. The combinatorial problem is formulated as a weighted set and includes a variety of different auctions such as forward auctions (sellers receive bids from one or more buyers for one or more products/services), reverse auctions (buyers receive bids from one or more sellers), and exchanges (multiple buyers and sellers submit asks and bids).

Exemplary embodiments are directed to solving combinatorial auctions that are difficult to optimize, such as the winner determination problem (WDP). For example in large auctions, it is computationally difficult to efficiently determine the allocation of goods once the bids have been submitted to the auctioneer (i.e., the winner determination problem). The problem is stated as follows: Given a set of bids in a combinatorial auction, find an allocation of items to bidders (including the possibility that the auctioneer retains some items) so that the allocation maximizes revenue for the auctioneer. This computational problem is NP-complete, meaning that a polynomial-time algorithm to find the optimal allocation is unlikely or difficult to find.

Exemplary embodiments are directed to combinatorial auctions and discussed in connection with an interval knapsack problem (I-KP), and the interval multiple-choice knapsack problem (I-MCKP), as generalizations of the classic 0/1 knapsack problem (KP) and the multiple-choice knapsack problem (MCKP), respectively. Compared to singleton items in KP and MCKP, each item i in I-KP and I-MCKP is represented by a $([a_i, b_i], p_i)$ pair, where the integer interval $[a_i, b_i]$ specifies the possible range of units, and $p_i$ the unit price. In one embodiment, results are provided as a FPTAS (fully polynomial-time approximation scheme) for I-KP with time $O(n \log n + n/\epsilon^2)$ and a FPTAS for I-MCKP with time $O(nm/\epsilon)$, and pseudo-polynomial-time algorithms for both I-KP and I-MCKP with time $O(nM)$ and space $O(n+M)$. Here n, m, and M denote number of items, number of item sets, and knapsack capacity respectively. Exemplary embodiments also present a 2-approximation of I-KP and a 3-approximation of I-MCKP both in linear time.

One embodiment applies I-KP and I-MCKP to a single-good multi-unit sealed-bid auction clearing problem where M identical units of a single good are auctioned. By way of example, focus is provided on two bidding models, including an interval, model that allows each bid to specify an interval range of units, and XOR-interval model that allows a bidder to specify a set of mutually exclusive interval bids. The interval and XOR-interval bidding models correspond to I-KP and I-MCKP respectively. One embodiment also shows how to compute VCG payments to all the bidders with an overhead of $O(\log n)$ factor. Results for XOR-interval bidding model imply improved algorithms for the piece wise constant bidding model and improve their algorithms by a factor $\Omega(n)$.

FIG. 1 illustrates an exemplary system or data processing network 10 in which exemplary embodiments are practiced. The data processing network includes a plurality of computing devices 20 in communication with a network 30 that is in communication with one or more computer systems or servers 40. By way of example, the computing devices 20 represent buyers and/or sellers in an electronic auction, and the servers 40 represent an electronic auctioneer.

For convenience of illustration, only a few computing devices 20 are illustrated. The computing devices include a processor 12, memory 14, and bus 16 interconnecting various components. Exemplary embodiments are not limited to any particular type of computing device or server since various portable and non-portable computers and/or electronic devices can be utilized. Exemplary computing devices include, but are not limited to, computers (portable and non-portable), laptops, notebooks, personal digital assistants (PDAs), tablet PCs, handheld and palm top electronic devices, compact disc players, portable digital video disk players, radios, cellular communication devices (such as cellular telephones), televisions, and other electronic devices and systems whether such devices and systems are portable or non-portable.

The network 30 is not limited to any particular type of network or networks. The network 30, for example, can include one or more of a local area network (LAN), a wide area network (WAN), and/or the internet or intranet, to name a few examples. Further, the computer system 40 is not limited to any particular type of computer or computer system. The computer system 40 can include personal computers, mainframe computers, servers, gateway computers, and application servers, to name a few examples.

Those skilled in the art will appreciate that the computing devices 20 and computer system 40 connect to each other and/or the network 30 with various configurations. Examples of these configurations include, but are not limited to, wireline connections or wireless connections utilizing various media such as modems, cable connections, telephone lines, DSL, satellite, LAN cards, and cellular modems, just to name a few examples. Further, the connections can employ various protocol known to those skilled in the art, such as the Transmission Control Protocol/Internet Protocol ("TCP/IP") over a number of alternative connection media, such as cellular phone, radio frequency networks, satellite networks, etc. or UDP (User Datagram Protocol) over IP, Frame Relay, ISDN (Integrated Services Digital Network), PSTN (Public Switched Telephone Network), just to name a few examples. Many other types of digital, communication networks are also applicable. Such networks include, but are not limited to, a digital telephony network, a digital television network, or a digital cable network, to name a few examples. Further yet, although FIG. 1 shows one exemplary data processing network, exemplary embodiments can utilize various computer/network architectures.

For convenience of illustration, an exemplary embodiment is illustrated in conjunction with an electronic auction. This illustration, however, is not meant to limit embodiments with electronic auctions. Further, exemplary embodiments do not require a specific type of auction. Further yet, although embodiments are discussed with respect to combinatorial auction, exemplary embodiments apply to a wide variety of other computing problems. Other embodiments include, but are not limited to, weighted set packing problem where a set is a combination of items and a weight is a bid price, weighted independent set problem modeled with a graph having vertices with associated weights, weighted maximum clique problem, and other problems that can be converted to the weighted independent set problem. Further, exemplary embodiments are applicable to various NP-complete problem (non-deterministic polynomial time) by converting it to a weighted set packing problem.

Figure 2:
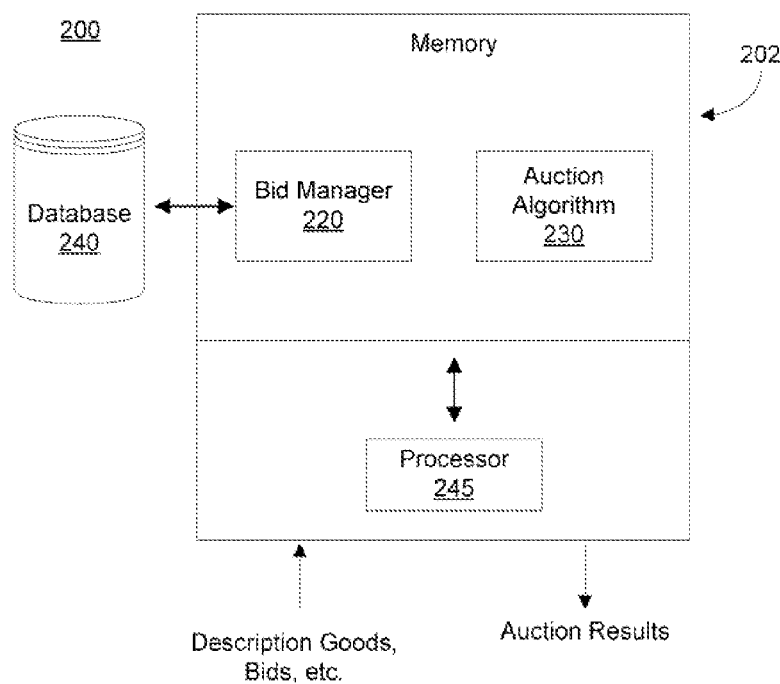
FIG. 2 illustrates an exemplary electronic auction in accordance with an exemplary embodiment.

FIG. 2 illustrates an exemplary system 200 for conducting electronic auctions and includes an electronic auctioneer 202 having a bid manager 220, one or more auction algorithms 230, and one or more processors 245 coupled to a database 240. As one example, the bid manager 202 and auction algorithm 204 are programs stored in the memory of computer system 40.

In one embodiment, the electronic auction receives descriptions of goods, bids, and other information and/or data pertaining to a combinatorial auction. The bid manager coordinates the information and manages the buying and selling of auctioned goods and/or services through electronic bidding. Auction results and winning bids are output to bidders (example, to computers 20).

Figure 3:
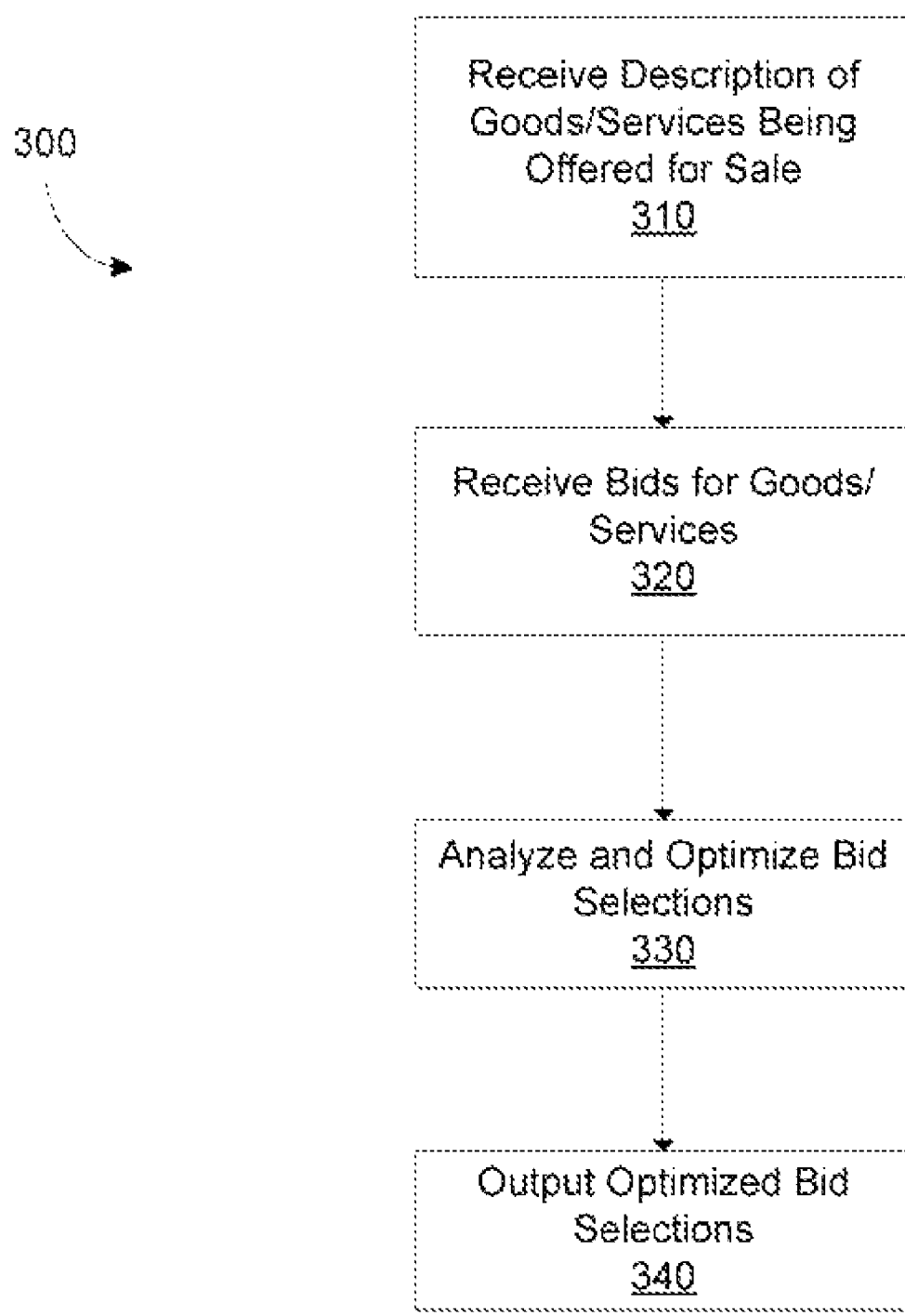
FIG. 3 illustrates an exemplary flow diagram in accordance with an exemplary embodiment.

FIG. 3 illustrates an exemplary flow diagram 300 in accordance with an exemplary embodiment. According to block 310, an electronic auctioneer or auction system receives a description of goods and/or services being offered for sale in a combinatorial auction. Next, according to block 320, the electronic auctioneer or auction system receives one or more bids for the goods and/or services. According to block 330, the electronic auctioneer or auction system analyzes and optimizes the bid selections (for example, using the auction algorithm 230 shown in FIG. 2 and discussed in more detail below). According to block 340, winning or selected bids are output (for example, output or displayed at a computer 20).

In order to facilitate farther discussion of exemplary embodiments, various sections are provided with headings.

Overview

One exemplary embodiment addresses single-good multi-unit combinatorial auctions with increasingly expressive bidding models, and where (weakly) tractable algorithms are possible. Specifically, one embodiment focuses on two bidding models, interval bids and XOR-interval bids (the former extends the traditional singleton bids and the later extends the piece wise constant bids). Exemplary embodiments formalize the corresponding auction clearing problem as new variants of knapsack problems and design near-optimal algorithms to solve them.

Problem Statement

One exemplary embodiment considers the one-round sealed-bid single-good multi-unit auction problem (SMAP) where there is only one single good and M identical units of it. The auctioneer wants to either sell at most M units of the good (forward auction) with maximum revenue, or acquire at least M units of the good (reverse auction) with minimum cost. For discussion, embodiments address the forward auction version since maximization and minimization are dual to each other. Most of the results for the forward auction version can be translated to the reverse auction version.

There are n bidders, each submitting a sealed bid, and the auctioneer decides winning bidders, the number of units allocated to them as well as the associated unit-prices. One embodiment considers the following four bidder models:
1. Point bid: a pair (x, p) where x is the number of units and p is the unit-price.
2. Interval bid: a tuple ($[x_1, x_u]$, p) where interval $[x_1, x_u]$ gives the range of units and p is the unit-price.
3. XOR-Point bid: a collection of point bids, with at most one point bid taken.
4. XOR-Interval bid: a collection of interval bids, with at most one interval bid taken.

Point bids correspond to items in the classic 0/1 knapsack problem (KP) where point bid (x, p) corresponds to an item with weight x and profit xp. XOR bids encode mutually exclusive bids. For example, a buyer submits a bid $(x_1, p_1) \otimes (x_2, p_2)$, with the intention of buying either $x_1$ units at unit-price $p_1$ or $x_2$ units at unit-price $p_2$, but not both. SMAP with XOR-point bids corresponds to the multiple-choice knapsack problem (MCKP), which is defined as follows: Given m sets of items, where item j in set i has weight $w_{ij}$ and profit $p_{ij}$, and a knapsack of capacity M, select a subset of items, at most one from each item set, to maximize their total profit while their total weight is at most M.

The interval bidding model generalizes the atomic point bidding model to an interval range of units. The XOR-interval bidding model is a more expressive model and generalizes the piecewise constant bidding model. In many procurement auction settings, in order to improve their total profit, suppliers offer volume discount, where the unit-price decreases as the number of units increases. The XOR-interval bid is one way of offering volume discount, and it is an extension to base bidding models.

Discussion

One embodiment addresses the interval knapsack problem (I-KP) and the interval multiple-choice knapsack problem (I-MCKP) as new generalizations of the classic 0/1 knapsack problem (KP) and the multiple-choice knapsack problem (I-MCKP), respectively. Results include a FPTAS for I-KP with time $O(n \log n+n/\epsilon^2)$ and a FPTAS for I-MCKP with time $O(nm/\epsilon)$, and pseudo-polynomial-time algorithms for both I-KP and I-MCKP with time $O(nM)$ and space $O(n+M)$. Here n, m, and M denote number of items, number of item sets, and a knapsack capacity respectively. One embodiment also presents a 2-approximation of I-KP and a 3-approximation of I-MCKP both in O(n) time. Some exemplary algorithms for both I-KP and I-MCKP match the corresponding time bounds for the best algorithms of KP and MCKP.

In one embodiment, I-KP and I-MCKP are applied to the single-good multi-unit auction clearing problem (SMAP) where M identical units of a single good are auctioned. One embodiment focuses on two bidding models, among them the interval model allows each bid to specify an interval range of units, and XOR-interval model allows a bidder to specify a set of mutually exclusive interval bids. The interval and XOR-interval bidding models correspond to I-KP and I-MCKP respectively, thus are solved accordingly. One embodiment also shows how to compute VCG payments to all the bidders with only an overhead of O(log n) for various bidding models, while another approach takes an overhead of factor O(n).

Results for XOR-interval bidding model imply improved algorithms for the piecewise constant bidding model. Specifically, results for XOR-interval model imply a FPTAS with time $O(n^2/\epsilon)$. Further, given an algorithm with an $\epsilon$-approximate and $\epsilon$-efficient VCG payment scheme with time $O((n^3/\epsilon)\alpha \log(\alpha n/\epsilon))$ where $\alpha$ is a constant related to "market no-monopoly," one embodiment provides an improvement to $O((n^2/\epsilon) \log n)$ time. Here, a constant-factor approximation for I-MCKP can be computed in O(n) time. Further, exemplary embodiments provide efficient solutions that identify one technical lemma for vector merging and another technical lemma for VCG computations, and get rid of unnecessary steps.

Definitions and Preliminaries

In this section, a discussion is provided for the interval knapsack problem (I-KP) and the interval multiple-choice knapsack problem (I-MCKP). The interval knapsack problem is a variant (generalization) of the classic 0/1 knapsack problem. Instead of singleton items in KP. I-KP associates with each item a unit-price and an interval range of units. It also generalizes the classic integer knapsack problem, either bounded or unbounded. As used herein, the I-KP is defined as follows:

Instance: Given a set of items S, each represented as an interval $[a_i, b_i]$ paired with a unit-price $p_i$, for $i=1, \ldots, n$, and a capacity bound M.

Objective: Find a subset $\{x_i | i \in S'\}$ and $S' \supset S$, such that $x_i \in [a_i, b_i]$, $\forall i \in S'$, $\Sigma_{i \in S} x_i \leq M$, and $\Sigma_{i \in S} x_i p_i$ is maximized.

Next, a discussion is provided for the interval multiple-choice knapsack problem (I-MCKP), a variant (generalization) of the classic multiple-choice knapsack problem (MCPK). As used herein, the I-MCPK is defined as follows:

Instance: Given a set of item sets $S_1, \ldots, S_m$, where item set $S_i$ contains $n_i$ items and each item $s_{ij} \in S_i$ is represented by a tuple $([a_{ij}, b_{ij}], p_{ij})$, for $i=1, \ldots, m$, and a capacity bound M.

Objective: Find a subset $\{x_{ij} | s_{ij} \in S_i, i \in I\}$, such that $x_{ij}=0$ or $x_{ij} \in [a_{ij}, b_{ij}]$ $\forall i \in I$, $\Sigma_{i \in I, j} x_{ij} \leq M$, there is at most one $x_{ij} \neq 0$ for each $i \in I$, and $\Sigma_{i \in I, j} x_{ij} p_{ij}$ is maximized.

Here $n = \Sigma_{1 \leq i \leq m} n_i$ is the total number of items in all the item sets.

Without loss of generality, it is assumed that $b_i \leq M$ for all i in I-KP, and $b_{ij} \leq M$ for all (i,j) pairs in I-MCKP, for the special case of I-KP where $a_i=b_i$ for all i, I-KP degenerates to the classic knapsack problem where item i has weight $a_i$ and profit $a_i p_i$. For the special case of I-MCKP where $a_{ij}=b_{ij}$ by for all (i,j) pairs, each item corresponds to a singleton element with weight $a_{ij}$ and profit $a_{ij} p_{ij}$, thus I-MCKP degenerates to MCKP. And if each item set contains exactly one item, I-MCKP degenerates to I-KP. Since KP is NP-hard, both I-MKCP and I-KP are NP-hard. It is easy to verify that both are in NP, thus both I-MKCP and I-KP are NP-complete. Fortunately, they are weakly NP-complete, as it will be shown in subsequent sections that both accept pseudo-polynomial-time exact algorithms and fully-polynomial-time approximation schemes (FPTAS).

A Linear Time Merging Subroutine

Next, a description is provided of a technical lemma that is used as a subroutine to merge a vector with an interval item to obtain a new vector. Let $A=(A_1, \ldots, A_d)$ be a vector with length d, and $[a_r, b_r]$ be an integer interval. It is desired to compute a new integer vector $C=(C_1, \ldots, C_d)$ where $C_k=\min\{A_k, C'_k\}$, and $C'_k=\min\{a_l+x_r | 1 \leq l \leq k, a_r \leq x_r \leq b_r, x_r \geq (k-1)c_r\}$, $\forall k=1, \ldots, d$.

Here $c_r$ is a positive constant, not necessarily integer. Intuitively, vector C is the result of merging vector A with an interval item $([a_r, b_r], p_r)$ where the unit-price $p_r$ is scaled down to a fractional value $1/c_r$. If $C_k=A_k$, no element is taken from the interval item. Otherwise, $C_k=C'_k$, an element $x_r \in [a_r, b_r]$ is taken. Furthermore, we want to make sure that $l+x_r/c_r \geq k$, i.e., the combined solution has its scaled value at least k. The simple approach takes time O(d) to compute one single value $C'_k$ thus $O(d^2)$ time for the whole vector C'. The following technical lemma shows that vectors C and C' can be computed in linear time:

Lemma 1. One embodiment computes vectors C and C' in time O(d).

The problem of merging a vector with an interval item is actually a special case of the so-called vector merge problem. By taking advantage of interval items, together with an advanced data structure, one embodiment improves bound and gets an asymptotically optimal result. Not surprisingly, the same result applies to the corresponding maximization version.

Lemma 2. Let $A=(A_1, \ldots, A_d)$ be a vector and $([a_r, b_r], p_r)$ an interval item. Let $C=(C_1, \ldots, C_d)$ where $C_k=\max\{A_k, C+_k\}$ and $C'_k=\max\{A_l+x_r p_r | 1 \leq l \leq k, a_r \leq x_r \leq b_r, x_r+l \leq k\}$, $\forall k=1, \ldots, d$. Here, one embodiment computes vectors C and C' in time O(d).

The Interval Knapsack Problem

In this section, one embodiment provides both a pseudo-polynomial-time exact algorithm and a FPTAS for I-KP. Further, one embodiment develops a pseudo-polynomial-time exact algorithm using DP-by-unit.

Let T(i,w) denote the maximum value for all solutions selected from the first i interval items with the total number of units bounded by w, for $1 \leq i \leq n$, $1 \leq w \leq M$. Let T(i) denote the vector with length M where the w-th position stores T(i,w) for all w. One embodiment then computes T(1) since T(1,w)=0 if $w \in (0, a_1)$, $T(1, w)=p_1 w$ if $w \in [a_1, b_1]$, and $T(1,w)=p_1 b_1$ if $w \in (b_1, M]$. Next, it is shown how to compute T(i) based on T(i−1) and $([a_i, b_i], p_i)$:

$$T(i,w) = \max\{T(i-1,w), \max\{T(i-1, w-x_i) + x_i p_i | a_i \leq x_i \leq b_i\}\}.$$

By Lemma 2, T(i) can be computed in time O(M) based on T(i−1), for each i. So that T(n) can be computed in time O(nM) and the optimal solution value is given by T(n, M). The space complexity is O(nM), however it can be reduced to O(n+M) using standard storage reduction technique.

One embodiment thus provides the following: Theorem 1. I-KP is weakly NP-complete and pseudo-polynomial-time solvable. We can compute the exact solution of I-KP in time O(nM) and space O(n+M).

FPTAS for I-KP

Next, one embodiment provides FPTAS for I-KP based on dynamic programming (DP). There are two ways to build the DP table, either by unit or by value. The DP-by-unit approach described above is more straightforward and incurs low overhead, but it is hard to convert into an approximation scheme. So one embodiment designs a FPTAS based on DP-by-value. First give a 2-approximation of I-KP in linear time, which is subsequently used for the FPTAS.

Lemma 3. One embodiment computes a 2-approximation of I-KP in O(n) time.

Next, a description is provided of FPTAS for I-KP. Let $V_o$ be twice the value of the 2-approximation solution, then $V^* \leq V_0 \leq 2V^*$ where $V^*$ is the optimal solution value. Use $V_0$ for a value rounding procedure in order to get the approximation scheme. Since a solution consists of at most n elements, a naive approach is to use $(\epsilon V_0/n)$ as the rounding factor, which results in a time complexity $\Omega(n^2)$. To get a O(n) running time ignoring other factors, divide items into two classes: small items and large items. Small items are those $([a_i, b_i], p_i)$ where $a_i p_i \leq \epsilon V_0$, large items are all others. For simplicity, assume that there are $n_S$ small items, $n_L$ large items, $n = n_S + n_L$ and all items with $i \leq n_L$ are large items. Consider large items first, and use the following value-rounding procedure for each item with value v:

$$v' = f(v) = \left\lfloor \frac{v}{\varepsilon^2 V_B} \right\rfloor \cdot \varepsilon^2 V_0$$

Notice that one embodiment only considers values $v \leq V_0$, thus the value-rounding procedure essentially reduces the number of distinct values to at most $1/\epsilon^2$ of them: $j \cdot (\epsilon^2 V_0)$ for $1 \leq j \leq 1/\epsilon^2$. Let L(i, k) denote the minimum weight over all solutions with profit at least $k \cdot \epsilon^2 V_0$ and elements selected from the first i rounded item sets, and L(i) denote the vector with length $1/\epsilon^2$ where the k-th cell stores L(i, k), for $k = 1, \ldots, 1/\epsilon^2$. The following recursive formula is used to compute L(i):

$$L(i, k), = \min\{L(i-1, k), L'(i, k)\} \text{ where}$$
$$L'(i, k) \equiv \min\{L(i-1, \ell) + x_i \mid x_i p_i \geq (k-\ell)\varepsilon^2 V_0, x_i \in [a_i, b_i]\}$$
$$= \min\{L(i-1, \ell) + x_i \mid x_i \geq (k-\ell)c_1, x_i \in [a_i, b_i]\},$$

for $k=1, \ldots, 1/\epsilon^2$ and $c_i = \epsilon^2 V_0/p_i$. Let $A_k = L(i-1, k)$, $C_k = L(i, k)$, for $k=1, \ldots, 1/\epsilon^2$, then Lemma 1 shows that L(i) can be computed from L(i−1) in $O(1/\epsilon^2)$ time, for all $1 \leq i \leq n_L$.

After vector $L(n_L)$ is computed, $L(n_L, k)$ is the minimum weight among large item solutions with value at least $k \cdot \epsilon^2 V_0$, for $k=1, \ldots, 1/\epsilon^2$. For each fixed $v = k \cdot \epsilon^2 V_0$, and the corresponding large item solution, one embodiment uses a greedy algorithm to pack the small items to the end of the large item solution. This requires sorting all small items with decreasing unit-prices and it takes time O(n log n). After the sorting, simply pack small items with decreasing unit-prices to the end of the solution corresponding to value $v = k \cdot \epsilon^2 V_0$, and stop immediately before the first time when the total number of units exceeds M. Let $S_v$ denote the solution consisting of large items with total value at least v and small items packed in the end. Then it takes O(n) time to obtain $S_v$ for each v. Actually the greedy packing only needs to walk through the small item list once: (1) Start with $k = k_0$ corresponding to the largest $v = k \cdot \epsilon^2 V_0$ such that $L(n_L, v) \leq M$; (2) Walk through the small items list from the beginning and stop at position $i_{k0}$ to obtain $S_{v0}$; (3) Set k:=k−1 and walk, through the small item list from its current position to the right until obtaining $S_v$ for the current $v = k \cdot \epsilon^2 V_0$; (4) Continue until k=0 or reaching the end of the small item list.

The greedy packing procedure takes time linear of the vector length, thus the total processing time for merging large items and small, items is $O(n \log n + 1/\epsilon^2)$. Once obtaining $S_v$ for each $v = k \cdot \epsilon^2 V_0$ and $k=1, \ldots, 1/\epsilon^2$, select among all $S_v$ the one with the maximum total value. Then, recover all the elements of the solution using standard backtracking techniques. In summary, the following is obtained:

Theorem 2: The above algorithm computes a $(1+\epsilon)$-approximation of I-KP in time $O(n \log n + n/\epsilon^2)$.

The Interval Multiple-Choice Knapsack Problem

Here, a description is provided of a pseudo-polynomial-time algorithm for I-MCKP which is similar to the algorithm described in Section 3 for I-KP. Let T(i) denote the vector with length M where the w-th position T(i,w) stores the maximum value for all solutions selected from the first i item sets with the total number of units bounded by w, for $1 \leq i \leq m$, $1 \leq w \leq M$. Let $T^j(i)$ denote the vector with length M where $T^j(i, w)$ denotes the maximum value over all solutions with elements selected from the first i−1 item sets, together with an element from $([a_{ij}, b_{ij}], p_{ij})$, where $1 \leq j \leq n_i$. Then compute T(1): $T(1, w) = \min\{T^j(1, w) | 1 \leq j \leq n_1\}$ where $T^j(1, w)$ is determined from $([a_{1j}, b_{1j}], p_{1j})$, for $1 \leq j \leq n_1$. Next, it is shown how to compute T(i) from T(i−1):

$$T^j(i,w) = \max\{T(i-1, w-x_{ij}) + p_{ij} x_{ij} | x_{ij} \in [a_{ij}, b_{ij}], x_{ij} \leq w\}.$$

By Lemma 2, $T^j(i)$ can be computed in time O(M) for each $1 \leq j \leq n_i$. Once a computation is made for $T^j(i)$ for all j, then:

$$T(i,w) = \max\{T(i-1,w), \max\{T^j(i,w) | 1 \leq j \leq n_i\}\},$$
$$\forall w = 1, \ldots, M.$$

So that it takes time O(n,M) to compute T(i), for $i=1, \ldots, m$. Since $\Sigma_{1 \leq i \leq m} n_i = n$, it takes in total O(nM) time to compute vector T(i), for $i=1, \ldots, m$. The optimal solution is given by T(m, M). In summary, the following is presented:

Theorem 3. I-MCKP is weakly NP-complete and pseudo-polynomial-time solvable. The above algorithm computes the exact solution of I-MCKP in time O(nM) and space O(n+M).

FPTAS for I-MCKP

Next, one embodiment provides a FPTAS for an I-MCKP based on DP-by-value. First, a description is provided of constant-factor approximations of I-MCKP, which are subsequently used for the FPTAS of I-MCKP. Constant-factor approximations of I-MCKP are summarized as follows.

Lemma 4. We can compute a 3-approximation of I-MCKP in O(n) time, and another (9/4)-approximation in O(n log m) time.

A description is now provided of a FPTAS to I-MCKP. Let $V_0$ be three times the value of the 3-approximation solution, then $V^* \leq V_0 \leq 3V^*$ where $V^*$ is the optimal solution value. Use a value rounding procedure to get an approximation scheme, using $(\epsilon V_0/m)$ as the rounding factor. Formally, given v, its rounded value is:

$$v' = f(v) = \left\lfloor \frac{vm}{\varepsilon V_0} \right\rfloor \cdot \frac{\varepsilon V_0}{m}$$

Let L(i, k) denote the minimum weight over all solutions with profit at least $k \cdot \epsilon V_0/m$, and elements selected from the first i rounded item sets, for $k=1, \ldots, m/\epsilon$. Let L(i) denote the vector with length $m/\epsilon$ where the k-th position stores L(i, k). The following formula is used to compute L(i) based on L(i−1):

$$L(i,k) = \min\{L(i-1,k), \min\{L^j(i,k) | 1 \leq j \leq n_i\}\} \text{ where}$$

$$L^j(i,k) = \min\{L(i-1,l) + x_{ij} | x_{ij} p_{ij} \geq (k-l)\epsilon V_0/m,$$
$$x_{ij} \in [a_{ij}, b_{ij}]\}.$$

Let $A_k = L(i-1, k)$, $C^j_k = L^j(i, k)$, $c_r = \epsilon V_0/(m p_{ij})$, for $k=1, \ldots, m/\epsilon$, $j=1, \ldots, n_i$. By Lemma 1, compute $C^j = L^j(i \ldots)$ for each j takes $O(m/\epsilon)$ time. Once $L^j(i)$ is obtained for each $j=1, \ldots, n_i$, then L(i) can be computed as the minimum over these vectors and L(i−1). In total, it takes $O(n_i m/\epsilon)$ to compute L(i) based on L(i−1). Since $\Sigma_i n_i = n$, thus in total it takes time $O(nm/\epsilon)$ to compute all vectors L(i) for $1 \leq i \leq m$. The optimal solution value is given by walking through the last vector L(m) and finding the largest $v = k \cdot \epsilon V_0/m$ such that $L(m, k) \leq M$. One embodiment recovers all the elements of the solution using standard backtracking techniques. In summary, one embodiment has:

Theorem 4. We can compute a (1+$\epsilon$)-approximation of I-MCKP in time $O(nm/\epsilon)$.

Applications to Multi-Unit Auction Clearing

In this section, one embodiment applies algorithms for I-KP and I-MCKP to solve the single-good multi-unit auction clearing problem (SMAP). For SMAP with point bids, it is equivalent to the classic 0/1 knapsack problem. As such, the following result occurs:

Theorem 5. For SMAP with point bids, we can compute the exact solution in time $O(nM)$ and space $O(n+M)$, and a (1+$\epsilon$)-approximation in time $O(n \min\{\log n, \log(1/\epsilon)\} + 1/\epsilon^2 \log(1/\epsilon) \min\{n, 1/\epsilon \log(1/\epsilon)\})$ and space $O(n+1/\epsilon^2)$.

For SMAP with interval bids, it is reduced to I-KP studied in Section 3. By Theorems 1 and 2, the following result occurs:

Theorem 6. For SMAP with interval bids, we can compute the exact solution in time $O(nM)$ and a (1+$\epsilon$)-approximation in time $O(n \log n + n/\epsilon^2)$.

For SMAP with XOR-point bids, it corresponds to exactly MCKP. For SMAP with XOR-interval bids, it corresponds to I-MCKP. By Theorems 3 and 4, the following combined results occur:

Theorem 7. For SMAP with XOR-point bids or XOR-interval bids, we can compute the optimal solution in time $O(nM)$ and a (1+$\epsilon$-approximation in time $O(nm/\epsilon)$.

As noted, the XOR-interval bidding model covers the piecewise constant bidding model as a special case. Therefore the following corollary is provided:

Corollary 1. Given a buyer with M units of a single good, and n suppliers with piecewise constant bidding curves where each curve has $O(1)$ pieces, we can compute an exact solution with time $O(nM)$ and a (1+$\epsilon$-approximation with time $O(n^2/\epsilon)$.

Alternate Algorithms for VCG Computations

In this section, one embodiment discusses how to compute VCG payments to all bidders under various bidding models. Vickrey-Clark-Grove (VCG) mechanism maximizes the expected payoff to the auctioneer and is strategyproof for all bidders. For any sealed-bid combinatorial auction, one embodiment embeds a VCG payment scheme to it: bidder i is given a discount of $V(I) - V(I \setminus \{i\})$ to its payment, $\forall i \in I$. Here I denotes the set of all bidders, V(S) denotes the maximum revenue for bids from S, for any $S \subset I$. While a straightforward approach requires solving $n+1$ winner determination problems with n bidders, here it is shown that an overhead of factor $O(\log n)$ is sufficient for our bidding models.

One embodiment starts with the interval bidding model with n interval items. For each $1 \leq r \leq n$, $1 \leq w \leq M$, let $T(I \setminus \{r\}, w)$ denote the maximum value for solutions consisting of elements excluding the r-th item, and total units bounded by w. Next, compute $T(I \setminus \{r\}, w)$ for all r, w values in $O(n^2 M)$ time using DP. In the following lemma, it is shown how to improve the running time to $O(nM \log n)$.

Lemma 5. We can compute $T(I \setminus \{r\}, w)$ for all $1 \leq r \leq n$, $1 \leq w \leq M$ with time $O(nM \log n)$.

Next, state results for VCG payments computations of SMAP with different bidding models. Results are based on variations of Lemma 5.

Theorem 8. For SMAP with point bids, we can compute the VCG payments to all the bidders in time $O(nM \log n)$, and an $\epsilon$-approximate VCG payment in time $O(T(n) \log n)$ where $T(n)$ is the running time of KP.

Theorem 9. For SMAP with interval bids, we can compute the VCG payments to all bidders in time $O(nM \log n)$, and an $\epsilon$-approximate VCG payment in time $O((n/\epsilon^2) \log n)$.

Theorem 10. For SMAP with XOR-point bids or XOR-interval bids, we can compute the VCG payments to all bidders in time $O(nM \log m)$ and an $\epsilon$-approximate VCG payment in time $O((nm/\epsilon) \log m)$.

Corollary 2. Given a buyer with M units of a single good, and n suppliers with piecewise constant bidding curves where each curve has $O(1)$ pieces, compute an $\epsilon$-approximate VCG payment in time $O((n^2/\epsilon) \log n)$.

As used herein, the term "combinatorial auction" means an auction in which bidders place one or more bids on combinations of items, or "packages," rather than just individual items. Further, as used herein, the term "auction" means the process of buying and selling goods and/or services by offering them for bid, taking bids, and then selling the goods and/or services to a winning bidder. Further, as used herein "XOR" is an exclusive disjunction or exclusive or being a logical operation on two or more operands that result in a logical value of true if and only if exactly one of the operands has a true value. The XOR produces a value of true when exactly one of its operands is true.

In one exemplary embodiment, one or more blocks in the flow diagrams are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The flow diagrams in accordance with exemplary embodiments are provided as examples and should not be construed to limit other embodiments within the scope of embodiments. For instance, the blocks should not be construed as steps that must proceed in a particular order. Additional blocks/steps can be added, some blocks/steps removed, or the order of the blocks/steps altered and still be within the scope of the invention. Further, blocks within different figures can be added to or exchanged with other blocks in other figures. Further yet, specific numerical data values (such as specific quantities, numbers, categories, etc.) or other specific information should be interpreted as illustrative for discussing exemplary embodiments. Such specific information is not provided to limit the exemplary embodiments.

Various exemplary embodiments are implemented as one or more computer software programs. The software is implemented as one or more modules (also referred to as code subroutines, or "objects" in object-oriented programming). The location of the software (whether on the client computer or elsewhere) will differ for the various alternative embodiments. The software programming code, for example, can be accessed by the processor of the computing device 20 and computer system 40 from long-term storage media of some type, such as a CD-ROM drive or hard drive. The software programming code can be embodied or stared on any of a variety of known media for use with a data processing system or in any memory device such as semiconductor, magnetic and optical devices, including a disk, hard drive, CD-ROM, ROM, etc. The code can be distributed on such media or can be distributed to users from the memory or storage of one computer system over a network of some type to other computer systems for use by users of such other systems. Alternatively, the programming code can be embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various exemplary embodiments. Numerous variations and modifications will become apparent to those skilled in the art once the above disclosure is fully appreciated. It is intended that the following claims be interpreted to embrace all such variations and modifications.

What is claimed is:

1. A method executed by a computer, comprising:
   receiving, at the computer, bids in a combinatorial auction for a sale of identical units of a good, having n bids;
   computing, by the computer, a fully polynomial-time approximation scheme (FPTAS) for an interval knapsack problem (I-KP) in time $O(n \log n + n/\epsilon^2)$ to calculate winning bids, wherein the I-KP associates with the good a unit price and an interval range of units, and wherein the winning bids are a subset of n, selected to find an optimal solution in time $O(n \log n + n/\epsilon^2)$; and
   displaying the winning bids.

2. The method of claim 1 further comprising, applying the I-KP to a single-good multi-unit auction clearing problem where M identical units of a single good are auctioned.

3. The method of claim 1, calculating a pseudo-polynomial-time algorithm for the I-KP with time $O(nM)$ and space $O(n+M)$ with M being knapsack capacity.

4. The method of claim 1 further comprising, specifying an interval range of units with each bid.

5. The method of claim 1 further comprising, specifying a set of mutually exclusive interval bids.

6. The method of claim 1 further comprising, computing a 2-approximation of the I-KP in $O(n)$ time, and using the 2-approximation as a basis for an approach based on building a dynamic programming table by value.

7. A non-transitory computer-readable medium having computer-readable program code embodied therein for causing a computer system to perform:
   receiving bids in a combinatorial auction for a sale of M identical units of a single good with n bids and m bidders;
   computing a fully polynomial-time approximation scheme (FPTAS) for an interval multiple-choice knapsack problem (I-MCKP) in time $O(nm/\epsilon)$ to calculate winning bids, wherein the winning bids are a subset of n, selected to find an optimal solution in time $O(nm/\epsilon)$; and
   outputting the winning bids.

8. The computer-readable medium of claim 7, wherein the code further causes the computer system to perform: applying the I-MCKP to a single-good multi-unit auction clearing problem where M identical units of a single good are auctioned.

9. The computer-readable medium of claim 7, wherein the code further causes the computer system to perform: calculating a pseudo-polynomial-time algorithm for the I-MCKP with time $O(nM)$ and space $O(n+M)$ with M being knapsack capacity.

10. The computer-readable medium of claim 7, wherein the code further causes the computer system to perform: computing a 3-approximation of the I-MCKP in $O(n)$ time and using the 3-approximation to build a dynamic programming table by value.

11. The computer-readable medium of claim 7, wherein the code further causes the computer system to perform: computing a (9/4)-approximation of the I-MCKP in $O(n \log m)$ time and using the (9/4) approximation to build a dynamic programming table by value.

12. The computer-readable medium of claim 7, wherein the code further causes the computer system to perform: computing a $(1+\epsilon)$-approximation of the I-MCKP in time $O(nm/\epsilon)$.

13. The computer-readable medium of claim 7, wherein the code further causes the computer system to perform: computing a solution in time $O(nM)$ and a $(1+\epsilon$-approximation for a single-good multi-unit auction clearing problem (SMAP) with interval bids.

14. A computer system, comprising:
    memory storing an algorithm;
    processor configured to execute the algorithm to:
    receive bids in a combinatorial auction for a sale of M identical units of a single good where bidders submit either interval range bids or xor-interval bids;
    compute a pseudo-polynomial-time algorithm for an interval multiple-choice knapsack problem (I-MCKP) with time $O(nM)$ and space $O(n+M)$ to calculate winning bids, wherein the winning bids are a subset of n selected to find an optimal solution in time $O(nM)$ and space $O(n+M)$; and
    display the winning bids.

15. The computer system of claim 14, wherein the processor further executes the algorithm to compute the pseudo-polynomial-time algorithm for an interval knapsack problem (I-KP) with the time $O(nM)$ and the space $O(n+M)$ to calculate winning bids.

16. The computer system of claim 14 wherein the processor further executes the algorithm to: apply the I-MCKP to a single-good multi-unit sealed-bid auction with M identical units of a single good are offered for sale.

17. The computer system of claim 14 wherein the processor further executes the algorithm to: using an XOR (exclusive or) interval model that allows a bidder to specify multiple interval ranges of units as bids for the items.

18. The computer system of claim 14 wherein the processor further executes the algorithm to: compute a vickrey-clark-grove (VCG) payment to bidders with an overhead of $O(\log n)$ factor.

19. The computer system of claim 14 wherein the processor further executes the algorithm to: using a dynamic programming (DP) by unit model to develop the pseudo-polynomial-time algorithm.

20. The computer system of claim 14 wherein the processor further executes the algorithm to: compute a 3-approximation of the I-MCKP in $O(n)$ time to build a dynamic programming table by value.

* * * * *

UNITED STATES PATENT AND TRADEMARK OFFICE
CERTIFICATE OF CORRECTION

| | |
|---|---|
| PATENT NO. | : 8,224,739 B2 |
| APPLICATION NO. | : 11/830606 |
| DATED | : July 17, 2012 |
| INVENTOR(S) | : Yunhong Zhou |

It is certified that error appears in the above-identified patent and that said Letters Patent is hereby corrected as shown below:

In column 12, line 17, in Claim 13, delete "$(1+\varepsilon\text{-}$" and insert -- $(1+\varepsilon)\text{-}$ --, therefor.

Signed and Sealed this
Twenty-ninth Day of January, 2013

David J. Kappos
*Director of the United States Patent and Trademark Office*